United States Patent [19]

Swanson

[11] Patent Number: 4,512,693
[45] Date of Patent: Apr. 23, 1985

[54] REVERSIBLE DRILL AND DRIVE TOOL HOLDER

[76] Inventor: Carl A. Swanson, 1351-B Chesapeake Ave., Naples, Fla. 33942

[21] Appl. No.: 453,522

[22] Filed: Dec. 27, 1982

[51] Int. Cl.³ .............................................. B23B 31/04
[52] U.S. Cl. .................................. 408/239 R; 7/165; 81/440; 279/14
[58] Field of Search ........... 408/117, 118, 119, 239 A, 408/239 R, 20, 22; 81/440, 449, 177 E, 177 ST; 7/158, 165, 168; 279/14, 24; 145/64

[56] References Cited

U.S. PATENT DOCUMENTS

| 336,732 | 2/1886 | Smith | 145/116 R |
|---|---|---|---|
| 750,182 | 1/1904 | Furbish | 81/440 X |
| 1,607,310 | 11/1926 | Ross | 7/158 |
| 1,697,414 | 1/1929 | Cordray | 279/14 |
| 2,629,415 | 2/1953 | Baker | 81/440 X |
| 2,632,489 | 3/1953 | Johnson | 7/165 X |
| 2,656,865 | 10/1953 | Bright | 81/440 X |
| 3,013,594 | 12/1961 | Nehls | 81/440 |
| 3,023,015 | 2/1962 | Pankow | 7/165 X |
| 3,892,149 | 7/1975 | Rydberg | 81/440 |
| 3,965,510 | 6/1976 | Ernst | 81/469 X |
| 4,092,753 | 6/1978 | Fuhrmann | 7/158 |

Primary Examiner—William R. Briggs
Assistant Examiner—Glenn L. Webb
Attorney, Agent, or Firm—Merrill N. Johnson

[57] ABSTRACT

A reversible drill and drive tool holder for use in performing a series of similar drill and drive operations. The tool holder consists of three major parts: a hollow cylindrical locking sleeve; an elongated shaft lying partially within the sleeve and having one end adapted to be held in the chuck of an electric drill and the other end forked; and a tool holding member rotatably pinned into the forked end of the shaft. The tool holding member has a socket at each end for holding a drill bit at one end and a driving tool at the other end. The shaft is held within the cylindrical sleeve by a spring-loaded pin and is capable of axial movement within the sleeve. When the shaft is moved forward against the spring, the tool holding member is freed to rotate about the pin in the front fork of the shaft, thus permitting either a drill bit or a driving tool to be moved into operating position. When either tool is in operating position, the opposite end of the tool holding member will retract under the force of the spring into the end of the sleeve and be held by the forward edge of the sleeve.

5 Claims, 4 Drawing Figures

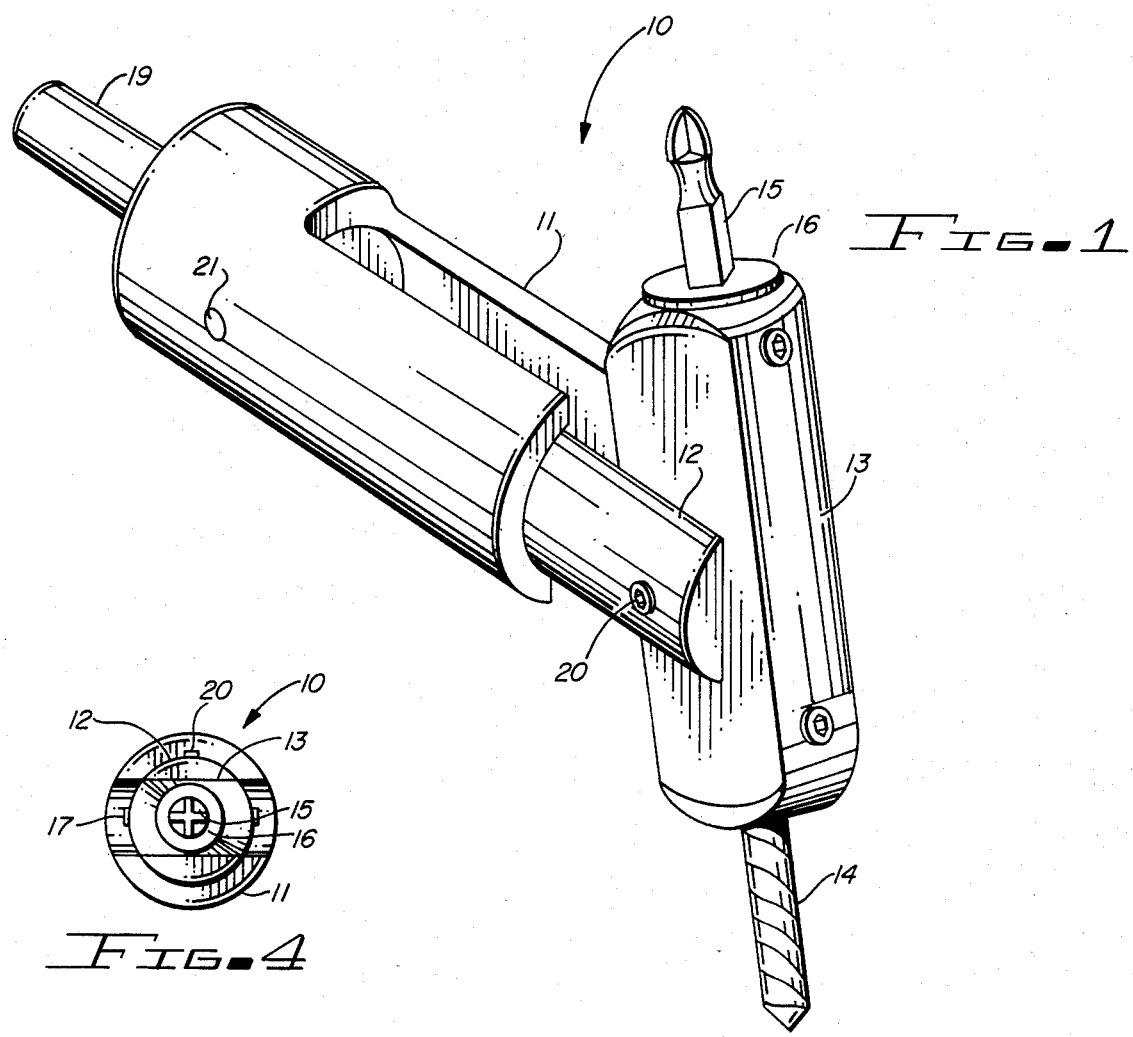
Fig-1
Fig-4
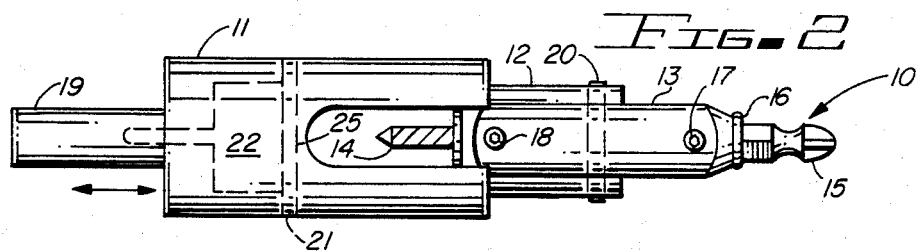
Fig-2
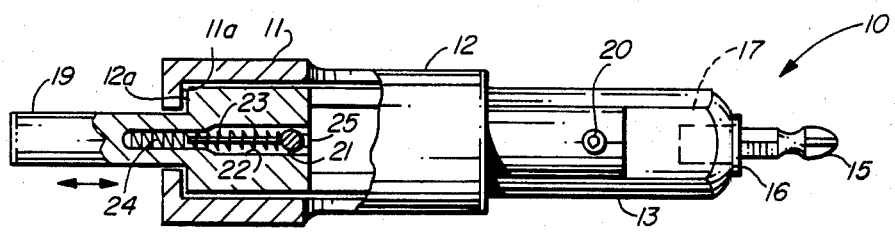
Fig-3

REVERSIBLE DRILL AND DRIVE TOOL HOLDER

BACKGROUND AND SUMMARY OF THE INVENTION

I have invented a unique reversible drill and drive tool holder. Then chucked into the chuck of an electric drill, my reversible tool holder eliminates the problems inherent in using two separate tools or previously suggested combination tools. My tool holder saves time, eliminates the inconvenience of multiple chucking and unchucking operations, and provides a safe lightweight reversible drill and drive tool holder that is economical to manufacture and simple to use.

In the construction and renovation of commercial and residential buildings as well as in various manufacturing operations, it is often necessary to perform a series of similar drill and drive operations. For example, first a hole is drilled into a wall or ceiling surface and then a screw or similar fixture is driven into the drilled hole. And these drilling and driving operations are repeated over and over again at adjacent locations.

In order to eliminate the use of two separate power driven tools or the constant chucking and unchucking of separate tools into one electric drill, various tool-holding attachments for electric drills have been suggested, including reversible tool holders. See, for example, U.S. Pat. Nos. 1,697,414; 3,023,015; 3,965,510 and 4,092,753. However, so far as I am aware, none of these prior suggestions has been widely accepted in the trade.

My reversible drill and drive tool holder includes three interconnected parts: a hollow cylindrical locking sleeve; an elongated shaft which lies partly within the sleeve and which has a rear end reduced in diameter for insertion into the chuck of an electric drill and a forward end forked to form a yoke; and a tool holding member rotatably pinned into the yoke of the shaft.

The tool holding member is elongated with a socket at each end or holding a removable drill bit at one end and a removable driving tool at the other end of the tool holding member.

One end of the sleeve contains a flanged axial hole through which the reduced rear end of the shaft to be chucked passes. The remainder of the shaft is forced against the flange of the sleeve by a spring-loaded mechanism within the shaft. When the shaft is moved axially forward against the action of the spring, the tool holding member is freed from engagement with the interior wall of the sleeve and is free to rotate about the pin which connects the tool holding member to the shaft's yoke.

Then when either tool is axially aligned and in operating position at the front end of the tool holder, the force of the spring will retract the shaft, causing the opposite end of the tool holding member to move into engagement with the forward end of the sleeve which thus locks the tool holding member into axial alignment.

The foregoing change from drill to drive operation or vice versa is readily accomplished with one hand in a few seconds, thus saving considerable time between each drill and drive operation.

BRIEF DESCRIPTION OF THE DRAWINGS

FIG. 1 is a perspective view of a preferred embodiment of my tool holder showing the drill and drive tool holding member being rotated to bring one of the tools into operating position;

FIG. 2 is a plan view of the tool holder shown in FIG. 1 with a Phillips head screwdriver in operating position.

FIG. 3 is a side view, partially broken away, of the tool holder shown in FIGS. 1 and 2, showing the internal spring-loaded mechanism which locks the tool holding member into operating position; and FIG. 4 is a front end view of the tool holder shown in FIG. 2.

DETAILED DESCRIPTION OF THE PREFERRED EMBODIMENT

Referring to the drawings, FIG. 1 shows a reversible drill and drive tool holder 10 having three interconnected parts: a hollow cylindrical locking sleeve 11; an elongated forked shaft 12 lying partially within sleeve 11; and a tool holding member 13 pinned into the forked forward end of shaft 12. Member 13 is shown with a drill bit 14 mounted on one end and a Phillips head screwdriver 15 removably held in a snap-in socket 16 mounted on its other end.

In FIG. 1 tool holding member 13 is shown being reversed to bring drill bit 14 into operating position at the front end of the tool holder. FIGS. 2, 3 and 4 show tool holder 13 locked into operating position within the forward end of sleeve 11 and screwdriver 15 ready for use.

Snap-in socket 16 is secured in one end of member 13 by a set screw 17 and drill bit 14 is secured in the other end of member 13 by a set screw 18, as best shown in FIG. 2.

The rear end of the shaft is reduced in diameter to form chuck engaging tang 19. The front end of the cylindrical shaft is deeply forked as best shown in FIG. 1 providing a yoke forward of sleeve 11 into which member 13 is rotatably pinned by pin 20 passing through both arms of the yoke and the center of tool holding member 13.

Tang 19 passes through a flanged axial hole in the rear end of sleeve 11 and, as best shown in FIG. 3, the interior face 11a of the flange normally rests against the annular surface 12a of shaft 12. Flange face 11a is forced against annular surface 12a by a spring-loaded mechanism best shown in FIG. 3 which includes pin 21, guide 23 and helical spring 24, all located within sleeve 11 and shaft 12.

A slot 22 is milled diametrically across shaft 12 and a cylindrical hole 25 is bored axially in the shaft. Then with flange face 11a against annular surface 12a, a hole is bored diametrically through sleeve 11 and shaft 12 as best shown in FIG. 2. Guide 23 and spring 24 are inserted into hole 25 and slot 22 and then pin 21 is inserted so as to secure the guide and spring in place.

Shaft 12 is normally maintained by the action of spring 24 with its annular surface 12a pressing against flange face 11a. But by the application of sufficient axial force forward as provided by the thumb and fingers of a human hand, shaft 12 can readily be moved axially forward so that the rearmost end of tool holding member 13 is freed from its normal engagement with the interior walls of sleeve 11 and is free to rotate about pin 20 which connects member 13 to the yoke of shaft 12.

Thus a change from drill to drive operation or the reverse can quickly and simply be made by a one hand manipulation in a few seconds. As shown in FIG. 1, the ends of member 13 are smoothly rounded so that as the tools are reversed and member 13 is being axially aligned, the end of member 13 will slip easily into engagement with the forward end of sleeve 11 against the action of spring 24 which in turn will seat the rearmost end of member 13 into locked and aligned position within the front interior faces of sleeve 11.

The preferred embodiment of my reversible drill and drive tool holder as shown and described will suggest certain modifications and rearrangements to those skilled in the art. The description of the preferred embodiment is not intended as any limitation of my invention, which is limited only by the scope and spirit of the following claims.

I claim:

1. A reversible drill and drive tool holder comprising: a hollow cylindrical locking sleeve having its open forward end forked to form a yoke with cylindrical interior sides and an axially bored cylindrical hole in its rear end, an elongated cylindrical shaft lying axially slidable partially within said sleeve and having a rear end of reduced diameter projecting through the hole in the rear end of the sleeve for insertion into the chuck of a drill and a forward end forked to form a yoke with parallel flat interior sides, an elongated two-ended tool holding member rotatably pinned at its center between the parallel flat sides of the yoke of said shaft, and spring loaded means lying along the axis of the cylindrical shaft for locking said tool holding member into axial alignment with said sleeve and shaft by retaining the rearmost end of the tool holding member within the cylindrical interior of the front end of the sleeve.

2. A tool holder according to claim 1 in which the two tool holding ends of the rotatably pinned tool holding member are smoothly rounded to facilitate the axial movement of the shaft within the sleeve as an end of the tool holding member is rotated into axial alignment with the sleeve and shaft.

3. A reversible drill and drive tool holder comprising:
a hollow cylindrical locking sleeve having an axially bored hole in its closed rear end and a forward end forked to form a yoke, a cylindrical shaft lying in axially slidable relation partially within said hollow sleeve and having a rear end of reduced diameter projecting through the hole in the rear end of the sleeve for insertion into the chuck of a drill and a forward end forked to form a yoke, a two-ended tool holding member rotatably pinned at its center into the forward end of the yoke of said shaft, and spring-loaded means lying along the axis of the cylindrical shaft for locking said tool holding member into axial alignment with said sleeve and shaft by retaining the rearmost end of the tool holding member within the interior of the forward end of the sleeve, the two tool holding ends of the rotatably pinned tool holding member being smoothly rounded to facilitate the axially sliding movement of the shaft within the sleeve as an end of the tool holding member is rotated into axial alignment with the sleeve and shaft.

4. A reversible drill and drive tool holder comprising:
a hollow cylindrical locking sleeve having an axially bored hole in its closed rear end and its open forward end forked to form a yoke, a cylindrical shaft lying in axially slidable relation partially within said hollow sleeve and having a rear end of reduced diameter projecting through the hole in the rear end of the sleeve for insertion in the chuck of a drill and a forward end deeply forked to form a yoke.

an elongated tool holding member having a tool removably mounted on each of its two ends, said member being rotatably pinned at its center into the forward end of the yoke of said shaft, and spring-loaded means within said shaft for locking said tool holding member into axial alignment with said sleeve and shaft by retaining the rearmost end of the tool holding member within the interior of the front end of the sleeve.

5. A tool holder according to claim 4 in which the spring-loaded means includes a helical spring lying within an axially bored hole in the shaft and retained therein by a pin connecting the sleeve and shaft.

* * * * *